United States Patent [19]

Schermutzki et al.

[11] 4,443,412
[45] Apr. 17, 1984

[54] CRYSTALLIZING APPARATUS

[75] Inventors: Konrad Schermutzki, Remseck; Wolfgang Weber, Waiblingen-Beinstein, both of Fed. Rep. of Germany

[73] Assignee: Santrade, Ltd., Lucerne, Switzerland

[21] Appl. No.: 364,443

[22] Filed: Apr. 1, 1982

[30] Foreign Application Priority Data

Apr. 24, 1981 [DE] Fed. Rep. of Germany ....... 3116277

[51] Int. Cl.³ .......................... B01D 9/00; C30B 15/30; C30B 35/00
[52] U.S. Cl. .................................. 422/247; 422/254; 156/603; 156/DIG. 88
[58] Field of Search ................ 422/247, 254; 156/603, 156/DIG. 88

[56] References Cited

U.S. PATENT DOCUMENTS

| | | | |
|---|---|---|---|
| 2,651,922 | 9/1953 | Graham | 422/254 |
| 2,665,973 | 1/1954 | Morningstar et al. | 422/254 |
| 3,147,085 | 9/1964 | Gatti | 422/254 |
| 4,323,419 | 4/1982 | Wakefield | 156/DIG. 88 |

FOREIGN PATENT DOCUMENTS 276921 11/1977 U.S.S.R. .............................. 422/254

Primary Examiner—David L. Lacey
Attorney, Agent, or Firm—Burns, Doane, Swecker & Mathis

[57] ABSTRACT

A crystallizing apparatus particularly for use with undercooled melts. Crystallizing is effected on the cooling conveyor belt in a thick layer. A precrystallizer comprises at least two rolls arranged above the cooling conveyor and rotating in the same direction. A shear gap is formed between the at least two rolls. A melt is applied to an uppermost one of the at least two rolls in a thin layer. In the course of the path followed by the melt over the at least two rolls, shearing forces are generated within the area of the shear gap, which enhance the nucleation. A further enhancement of nucleation is obtained by cooling the at least two rolls, so that relatively large volumes of the melt may be crystallized per unit time in the crystallizing apparatus without the need for the addition of supplemental seed crystals to the melt. The amount of melt in the precrystallizer is very small.

14 Claims, 5 Drawing Figures

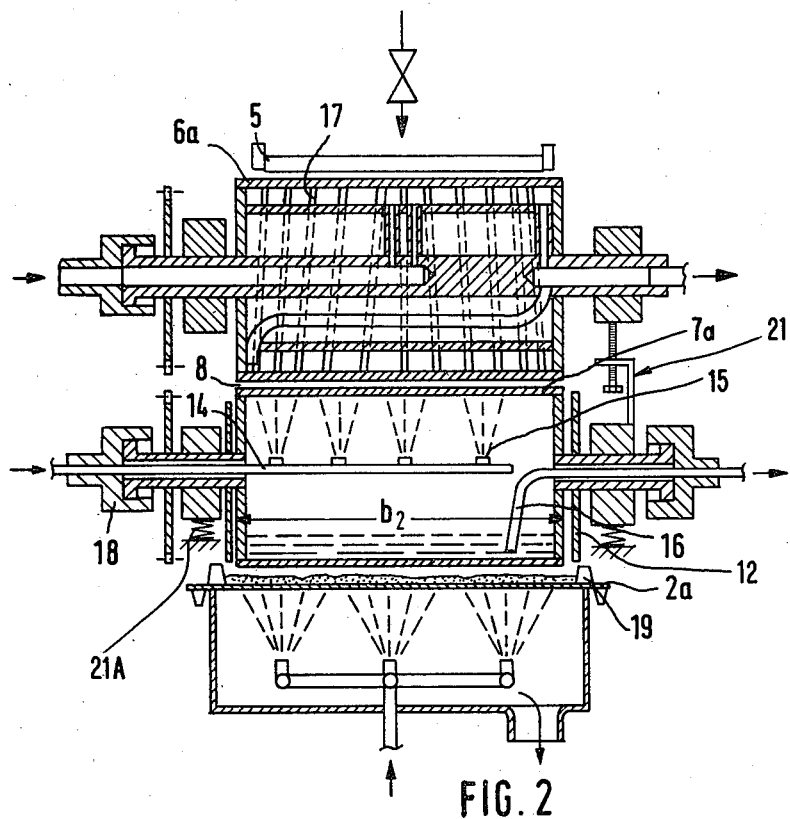
FIG. 2
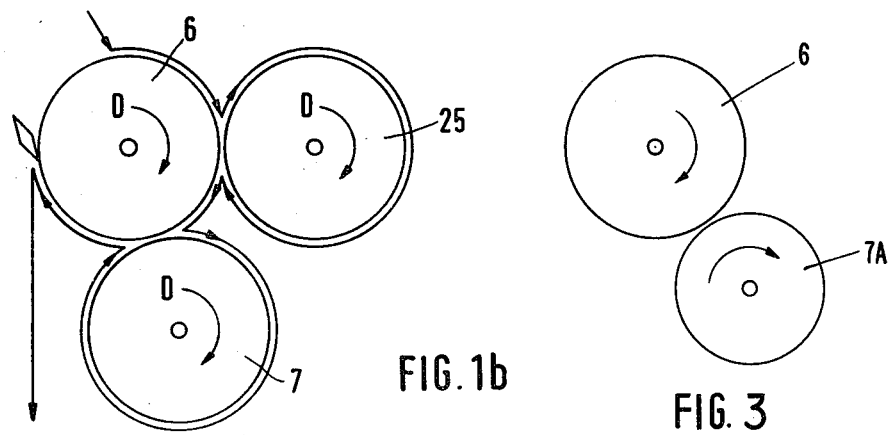
FIG. 1b
FIG. 3

CRYSTALLIZING APPARATUS

BACKGROUND AND OBJECTS OF THE INVENTION

The invention concerns a crystallizing apparatus consisting of a crystallizing conveyor (cooling conveyor) and a precrystallizer, with nucleation being introduced in the precrystallizer in a thin layer and crystallization effected on the cooling conveyor, to which the precrystallized melt is appled in a thick layer.

Crystallizing installations of this type are used for the crystallization of melts, wherein the rate of nucleation is attaining a maximum for a given undercooling. The crystal growth rate is similarly strongly dependent on temperature so that it is desirable in the crystallization of large masses to satisfy the conditions required for optimum nucleation and optimum crystal growth, respectively, so that large masses may be crystallized.

For the purpose, precrystallizers are employed wherein nucleation is initiated, followed by crystallization on endlessly rotating cooling conveyors, upon which the melt is uniformly distributed. Cooling is attained by means of a cocling bath arranged directly under the upper flight of the conveyor or the direct immersion of the conveyor in the cooling bath, so that crystallization takes place while the solidifying melt is on the conveyor, from the end whereof the crystallized product is removed. It is known to use as the precrystallizer a crucible into which the melt is introduced, with the crucible being placed above the onset of the conveyor so that the melt may be poured onto the conveyor through a lower opening. The crucible is maintained at a temperature corresponding to the temperature of the maximum rate of nucleation. To increase the rate of nucleation, a crystal powder is added to the melt in the crucible, which is taken from the crystallizing area and must be ground, representing an additional expense. A further disadvantage of this type of precrystallization is that the temperature must be controlled very accurately to prevent the remelting or the solidification of the melt in the crucible.

In another known configuration, the precrystallizer is arranged in the inlet zone of the melt; it is at a temperature that is optimal for nucleation. With the aid of bean-shaped wipers, seed crystals are transferred from the crystallizing area into this inlet zone of the melt and are able to contribute through their intensive mixing action to a multiplication of the number of nuclei, provided that the temperature is controlled so that the interval of the highest frequency of nuclei is not traversed at an excessive velocity. The fact that seed material must be added to the melt in order to multiply the number of nuclei is a disadvantage in this type of precrystallization. This always leads to an increased equipment outlay and additional seeding material is needed.

It is an object of the invention to minimize problems of the above-described type and to provide a crystallizing apparatus whereby an optimum nucleation rate and number of nuclei may be obtained without the addition of supplemental seed material to a precrystallizer.

SUMMARY OF A PREFERRED EMBODIMENT OF THE INVENTION

The invention involves forming the precrystallizer of at least two rolls rotating in the same direction. The rolls are arranged above the cooling conveyor and over each other. The axle of the uppermost roll is offset in a direction toward the onset of the belt parallel to a vertical plane located through the axle of the lower roll. The rolls are arranged so that their peripheral surfaces form a shear gap at the location of their shortest distance from each other. The width of that gap is less than the layer thickness of the melt applied to the uppermost roll. A scraping blade acts on the periphery of the uppermost roll, on the side thereof facing the onset of the conveyor belt. A precrystallizer of this type renders the addition of supplemental seed material to the melt, unnecessary, as nucleation is promoted by the use of rolls and their suitable arrangement with respect to each other, with the aid of shear and abrasive forces. The melt is fed onto the uppermost roll and is subsequently distributed over it in a thin layer by the rotating motion of the roll and is adhering to the peripheral surface area of the uppermost roll until it reaches the area (shear gap) wherein the roll distance to the next roll is very small. This distance is smaller, according to the invention, than the layer thickness of the melt applied, so that the latter will be abraded from the upper roll in the shear gap formed in this manner or is piling up in front of said shear gap. This is followed by a transfer onto the next roll rotating in the same direction, with the effect carried further depending on the number of rolls provided, until finally the melt returns to the uppermost roll and is scraped off by the scraper blade so that it drops onto the start of the cooling conveyor running below the rolls.

It is highly advantageous to provide the rolls with a cooling device to cool the surfaces of the rolls. This cooling device may be provided in the form of a pipe formed by the axle of the roll, connected with a circulation of heat and equipped with spray nozzles within the contour of the roll surface. The nozzles are directed against the inner wall of the jacket of the rolls. A suction drain conducts the cooling water from the inside of the rolls to the circulating system. This makes it possible to directly affect the cooling temperature of the roll surfaces and thus also the rate of nucleation, since the melt applied to the rolls in a thin layer is cooled to the temperature of maximum nucleation. This controlled undercooling on the surfaces of the rolls enhances the efficiency of the entire crystallizing installation.

It may also be of an advantage to design the cooling device in the form of a progressive helical guide passing over the inner circumference of the roll jacket and conducting the cooling water. Such a progressive helical guide insures the highly uniform cooling of the roll jacket surfaces, enhancing in turn the uniform precrystallization of the melt.

In order to precrystallize different layer thicknesses and different melts, it is an advantage to make the shear gap adjustable by means of a stop. This is effected by varying the roll distance, for example, by means of spring elements or pressure rolls, so that the melt does not pass through the shear gap but is piled up at the onset of the shear gap as viewed in the direction of the melt and is then applied to the following roll.

It may also be advantageous to provide the rolls with different diameters, whereby they may be adapted to the melt to be precrystallized, i.e., to its rate of nucleation, so that optimum velocities of nucleation may be obtained. It is also favorable, in cases where the precrystallizer according to the invention is to be used for melts of different nature, to be able to regulate the circumferential velocity of the rolls separately for each roll. It is possible thereby to have shear forces of different magnitude acting in the shear gap, thus providing additional means to affect nucleation. The rolls may, however, also be controlled by means of a common drive, so that they are operating with a fixed rpm ratio.

It is further advantageous to use a heated scraper blade. This facilitates the lifting of the precrystallized melt from the roll and prevents the formation of a crust on the scraper blade, which would interfere with the reliable removal of the melt.

It is further highly favorable to equip the cooling conveyor with a retaining ledge arranged laterally on the conveyor belt, parallel to the direction of transport, as this renders it feasible to let the precrystallized melt solidify rapidly in a thick layer on the cooling conveyor. The capacity of the cooling conveyor may be increased substantially by this measure. Cooling on the cooling conveyor is effected best by zone cooling, whereby temperatures differing by section may be obtained on the conveyor by means of cooling elements arranged under the belt, so that the melt may be affected in keeping with its solidification phase.

The capacity of this crystallizing installation may be very large, when the roll width amounts to approximately 90% of the width of the cooling conveyor belt. In this manner nearly all of the width of the cooling conveyor belt is utilized, thereby insuring the uniform distribution of the precrystallized melt over the conveyor belt.

To assure the uniform application of the melt to the uppermost roll, it is advantageous to arrange an overflow weir above the uppermost roll, so that a line of application of the melt on the uppermost roll is located slightly in front of the summit of the uppermost roll. A feed weir of this type insures the uniform distribution of the product over the entire width of the roll.

THE DRAWING

Further advantages and characteristics of the invention will become apparent from the dependent claims and the examples of the embodiments shown in the figures and described hereinafter, of a crystallizing installation according to the invention. In the drawing:

FIG. 1a shows schematically the path followed by the melt in the first embodiment over the rolls;

FIG. 1b shows schematically the path taken by the melt over the rolls in another embodiment;

FIG. 2 shows a cross-section taken along line II—II of FIG. 1; and

FIG. 3 shows schematically two rolls of different diameter.

DETAILED DESCRIPTION OF PREFERRED EMBODIMENTS OF THE INVENTION

Figure 1:
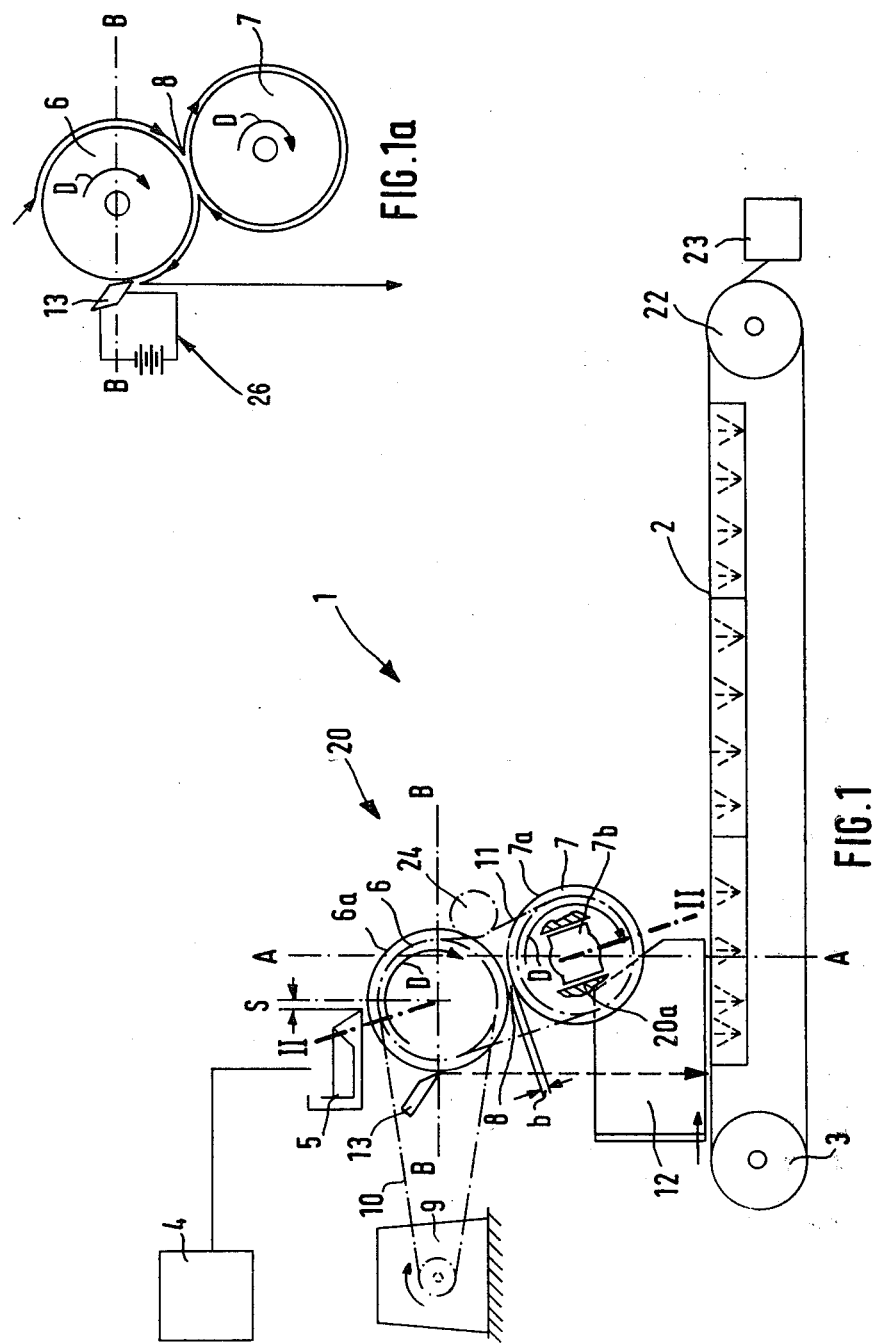
FIG. 1 shows a schematic lateral elevation of a crystallizing installation according to a first embodiment of the invention.

The crystallizing installation of FIG. 1 has a cooling conveyor belt 2 and a precrystallizer 20, through which a melt produced in a reactor 4 is applied to the conveyor cooling belt 2. It is the function of the precrystallizer 20 to control nucleation in a manner so that the melt applied to the cooling conveyor belt 2 is able to crystallize thereon. The cooling conveyor belt 2 is driven by the drive rolls 3 in the manner of an endless belt, whereby at the discharge end 22 the crystallized mass may be taken off and comminuted in a breaker 23.

The precrystallizer 20 is constructed, in the embodiment shown in FIGS. 1 and 1a, of two rolls 6 and 7, arranged above each other; it is, however, conceivable to arrange three or more rolls in the same manner above or adjacent to each other, as shown in FIG. 1b. The melt is applied to the uppermost roll designated in the embodiment of FIG. 1 by numeral 6, in an area spaced a distance 5 from the summit of the upper roll 6. The melt is applied by means of a feed weir 5, assuring the uniform distribution of the melt over the peripheral surface area 6a of the roll 6 in a thin layer. The rolls are arranged so that the axle of the uppermost roll 6 is located parallel to a vertical plane A—A through the axle of the lower roll 7 and offset in the direction of the onset (upstream end) of the belt. This results in the fact that at the removal location wherein a scraper blade 13 is lifting off the precrystallized melt, the latter is able to drop freely onto the cooling conveyor belt 2 arranged under it. The rolls are further arranged to be displaceable with respect to each other. As shown in the embodiment of the invention, the roll 7 is supported displaceably parallel to the cross-section plane II—II, which contains the axles of both rolls 6, 7. The axle of the roll 7 is supported in a longitudinal guide 20a by means of a bearing support 7b displaceable in the longitudinal guide 20a. The bearing support 7b is equipped with a stop 21 to position itself relative to the roll 6 and limit the thickness of the layer of the melt, and has springs 21A or cylinders to generate holding forces.

The rolls 6 and 7 are driven by a drive motor 9 so that they are both rotating in the same direction (i.e., clockwise as depicted in FIG. 1 by the arrow D). The drive of the two rolls may be synchronous, but it may also be independent and separate so that different relative roll velocities are obtained for the upper roll 6 and the lower roll 7. The rolls may be driven by means of V-belts 10 and 11, with a pulley 24 being arranged so that the transmission may be effected reliably.

The rolls 6 and 7 are arranged with respect to each other so that they form a shear gap 8, the width of which is smaller than the layer thickness of the melt applied. The shear gap 8 is adjustable by displacing the rolls in relation to each other, preferably between 0.1 and 0.5 mm. Since the rolls 6, 7 rotate in the same direction, the peripheries of the rolls 6 and 7 travel in opposite directions through the shear gap 8. The path of the melt taken over the rolls 6 and 7 is shown in FIG. 1a, wherein it is seen that the melt cannot pass through the shear gap 8, but that it is piled-up in this area upon impact, whereupon it is transferred to the lower roll 7 by the rotation of the latter and further cooled thereon, until it again encounters the shear gap from the other side and is transferred back to the roll 6 located above it. In the area of the roll surface of the upper roll 6 a scraper blade 13 which may be heated by an electric circuit 26 (FIG. 1a), is arranged so that it is located in the area of the intersection of a horizontal line B—B through the axle of the upper roll 6, with an intersection pointing toward the end of the belt. From here, the precrystallized melt is lifted off and drops onto the belt 2 arranged under it. As the result of the pile-up of the melt in the area of the shear gap, shear forces are acting on the melt, which are greatly enhancing nucleation by increasing the number of nuclei. In the shear gap itself, the partially solidified melt adhering to the rolls is abraded and brought into the area of the piled-up melt, thereby enhancing nucleation.

In order to attain the proper nucleating temperature, the melt is cooled strongly; this may be effected by means of a cooling installation acting from the inside on the jacket surface of the rolls. The cooling isntallation, as shown in FIG. 2, may consist of a spray bar 14 equipped with nozzles 15, through which cooling water introduced through a packing box 18 is sprayed from the inside onto the jacket surfaces. This is illustrated for the lower roll in FIG. 2. The cooling water is removed by pumping through a suction drain 16 and recycled after cooling. However, the cooling installation may also consist of progressive helical guides 17, the connections of which are joined through an axle with the water circulation, with the helical guides 17 running around the jacket surface 6a to define a helical water passage. Very uniform cooling may be obtained with helical guides of this type; this accelerates and uniformly enhances nucleation. The diameters of the two or several rolls 6, 7A may be different in size (FIG. 3) and adapted to the particular melt to be crystallized and is essentially a function of the rate of nucleation of the melt involved. The rotational velocity of the rolls may also be controlled separately, so that different nucleation times may be obtained in the precrystallizer. It may be further seen in FIG. 2 that the width of application $b_2$ of the melt amounts to approximately 90% of the width of the roll, so that nearly all of the roll surface is used for precrystallization. An installation of this type is thus capable of processing relatively large masses of a melt in a continuous manner.

In the area of the belt 2, of which the upper loop 2a may be seen in FIG. 2, longitudinally extending retaining ledges 19 are provided, making possible the application of relatively thick layers of the melt to be precrystallized to the belt. A spray guard 12 is further arranged in the area of melt application to the belt as shown in FIG. 1.

The speed of the periphery of the uppermost roll is higher by a factor of approximately 10 to 50 than that of the cooling conveyor belt. This insures the fact that even though the melt may be precrystallized in a thin layer, it is possible to crystallize it in thick layers on the cooling belt, so that large volumes of the melt may be crystallized with the installation.

A further possible layout of the roll is shown in FIG. 1b, wherein another roll 25 is arranged in a horizontal plane with the upper roll 6, with the melt being passed during precrystallization on its way from the point of application to the point of discharge on the roll 6 along the arrows shown, over the roll 25. When relatively long paths are required for precrystallization, this arrangement may be used advantageously.

Crystallizing installation of the above-described type may be operated without the seed nuclei that must be added in the known configurations to initiate or to enhance the nucleation of the melt. The invention eliminates this requirement. Furthermore, production capacities are higher than with those previously made known in the art.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a crystallizing apparatus comprising a crystallizing belt and a precrystallizer, wherein nucleation of a melt in the precrystallizer is initiated in a thin layer, followed by crystallizing on the crystallizing belt, to which the precrystallized melt is applied in a thicker layer, the improvement wherein the precrystallizer comprises at least two rolls rotating in the same direction, said at least two rolls being arranged one above the other and both over said crystallizing belt so that the axle of an uppermost one of said at least two rolls is offset in the direction of the onset of the belt relative to the axle of the lowermost one of said at least two rolls, said at least two rolls being arranged so that their peripheral surfaces form therebetween a shear gap at the point of their shortest separation, the width of which being less than the thickness of the melt applied to the uppermost roll, a scraper blade arranged to act on the peripheral surface of the uppermost roll on a side thereof facing in the direction of the onset of the conveyor belt to remove the melt therefrom.

2. Crystallizing apparatus according to claim 1, wherein said at least two rolls include means for cooling the peripheral surfaces of said at least two rolls.

3. Crystallizing apparatus according to claim 2, wherein said cooling means includes a spray bar extending axially into one of said at least two rolls, said spray bar being connected with water circulation means and equipped with a plurality of spray nozzles directed toward the internal wall of said one roll, a suction drain provided to recycle the cooling water from said one roll interior to said water circulation means.

4. Crystallizing apparatus according to claim 2, wherein said cooling means comprises a helical guide extending around the internal circumference of each of said rolls and forming a helical passage within which the cooling water is conducted in contact with the inside wall of the respective roll.

5. Crystallizing apparatus according to claim 1, wherein the apparatus includes means for causing the shear gap to be adjustable in thickness.

6. Crystallizing apparatus according to claim 1, wherein said at least two rolls have different diameters.

7. Crystallizing apparatus according to claim 6, wherein the at least two rolls have a fixed rpm ratio and have a common drive mechanism.

8. Crystallizing apparatus according to claim 1, wherein the apparatus includes an independently controllable drive mechanism for controlling the speed of rotation of the at least two rolls.

9. Crystallizing apparatus according to claim 1, including means for heating said scraper blade.

10. Crystallizing apparatus according to claim 1, wherein said belt includes retaining ledges extending along the sides thereof parallel to the direction of transport.

11. Crystallizing apparatus according to claim 1, wherein the width of the at least two rolls amounts to approximately 90% of the width of said belt.

12. Crystallizing apparatus according to claim 1, wherein a feed weir is arranged above the uppermost roll so that a flow line of the melt from the weir to the uppermost roll is located slightly in front of the summit of the upper roll, as viewed in the direction of rotation.

13. Crystallizing apparatus according to claim 1, wherein said scraper blade is arranged to act on the periphery of said uppermost roll in the area of the intersection of said periphery and a horizontal plane through the axle of said uppermost roll.

14. Crystallizing apparatus according to claim 1, wherein said at least two rolls includes a further roll provided adjacent to said uppermost roll and forming a second shear gap with said uppermost roll.

* * * * *